(12) United States Patent
Dye et al.

(10) Patent No.: US 10,315,141 B2
(45) Date of Patent: Jun. 11, 2019

(54) THERMALLY BONDED MULTI-LAYER FELT FILTRATION MEDIA

(71) Applicants: Andrew Ray Dye, Aledo, TX (US); Jack David Burns, Mineral Wells, TX (US); Johnny Glen Keeton, Mineral Wells, TX (US)

(72) Inventors: Andrew Ray Dye, Aledo, TX (US); Jack David Burns, Mineral Wells, TX (US); Johnny Glen Keeton, Mineral Wells, TX (US)

(73) Assignee: Parker Hannifin Filtration (US), Inc., Minerals Wells, TX (US)

( * ) Notice: Subject to any disclaimer, the term of this patent is extended or adjusted under 35 U.S.C. 154(b) by 87 days.

(21) Appl. No.: 15/336,326

(22) Filed: Oct. 27, 2016

(65) Prior Publication Data

US 2017/0120174 A1    May 4, 2017

Related U.S. Application Data

(60) Provisional application No. 62/248,065, filed on Oct. 29, 2015.

(51) Int. Cl.
*B01D 39/16* (2006.01)

(52) U.S. Cl.
CPC .... *B01D 39/163* (2013.01); *B01D 2239/0208* (2013.01); *B01D 2239/0668* (2013.01); *B01D 2239/0695* (2013.01); *B01D 2239/10* (2013.01); *B01D 2239/1208* (2013.01); *B01D 2239/1258* (2013.01); *B01D 2239/1291* (2013.01)

(58) Field of Classification Search
CPC .......... B01D 39/163; B01D 2239/1291; B01D 2239/0668; B01D 2239/0208; B01D 2239/10; B01D 2239/1208; B01D 2239/1258; B01D 2239/0695
USPC ................................ 210/490, 503, 505, 508
See application file for complete search history.

(56) References Cited

U.S. PATENT DOCUMENTS

| | | | |
|---|---|---|---|
| 5,234,739 A | 8/1993 | Tanaru et al. | |
| 5,827,430 A | 10/1998 | Perry, Jr. et al. | |
| 5,919,279 A | 7/1999 | Merritt et al. | |
| 6,110,249 A * | 8/2000 | Medcalf ............ | B01D 46/0001 55/498 |

(Continued)

FOREIGN PATENT DOCUMENTS

| | | |
|---|---|---|
| CN | 1982523 A | 6/2007 |
| DE | 202007008372 U1 | 9/2007 |
| JP | 11107155 A | 4/1999 |

*Primary Examiner* — Madeline Gonzalez
(74) *Attorney, Agent, or Firm* — Reinhart Boerner Van Deuren P.C.

(57) ABSTRACT

A filter formed essentially from a staple fiber is provided. A nonwoven staple fiber is compressed in to a mat or sheet of selected porosity. The mat or sheet does not include a binder or bicomponent fibers. The staple fibers may be heat treated. The sheet is formed into a selected geometric shape and the staple fibers are thermally fused to bind the staple fibers into a porous filter element. The preferred shape is a helically wound tube or plural sheets, each sheet being self-overlapped and compressed to overlap another sheet. Each sheet is preferably heated and compressed individually and the sheets may be selected to have different porosities and densities.

25 Claims, 8 Drawing Sheets

(56) References Cited

U.S. PATENT DOCUMENTS

| | | | |
|---|---|---|---|
| 7,883,562 B2 * | 2/2011 | Healey | B01D 39/1623 55/487 |
| 8,936,661 B2 | 1/2015 | Burns et al. | |
| 2008/0128364 A1 | 6/2008 | Cloud et al. | |
| 2011/0139008 A1 | 6/2011 | Smithies et al. | |
| 2011/0210059 A1 | 9/2011 | Green et al. | |
| 2011/0232835 A1 | 9/2011 | Choi | |
| 2013/0193063 A1 | 8/2013 | Ng et al. | |
| 2014/0275692 A1 | 9/2014 | Patel et al. | |

* cited by examiner

THERMALLY BONDED MULTI-LAYER FELT FILTRATION MEDIA

CROSS-REFERENCE TO RELATED PATENT APPLICATION

This patent application claims the benefit of U.S. Provisional Patent Application No. 62/248,065, filed Oct. 29, 2015, the entire teachings and disclosure of which are incorporated herein by reference thereto.

FIELD OF THE INVENTION

This invention generally relates to filter elements and methods of manufacturing filter elements from felted nonwoven filtration media including staple fibers.

BACKGROUND OF THE INVENTION

Non-woven filtration media suitable for multi-layer thermally bonded filter elements are generally known. Such nonwoven filtration medias are commonly prepared by a mechanical carding process followed by thermally bonding the carded fibrous web with a bicomponent fiber or binder. A bicomponent fiber is a fiber that has an outer sheath layer of one polymer and an inner core made of another polymer. The outer sheath layer is usually constructed of a polymer with a lower melting point than the inner core material. The use of bicomponent fibers in a nonwoven carded fiber mat allows the lower outer sheath layer to melt when exposed to heat in an oven, while the inner core material does not melt in the same temperature conditions. The outer sheath layer melts and wicks between fibers to thermally bond fibers together where they intersect in the fiber mat. The outer sheath material thus forms a thermal bonding material, while the inner core material remains solid providing strength and structure to the filter media.

Laminated, multi-layer filter elements including bicomponent fibers and/or binder materials are also known in the art. For example, non-woven filter elements constructed with a mix of staple and bi-component fibers are described in U.S. Pat. No. 5,827,430 entitled "Coreless and spirally wound non-woven filter element," the entire disclosure of which is hereby incorporated by reference in its entirety. Strips of a nonwoven filter material including both staple fibers and bicomponent fibers are wound together under compression and thermally bonded to form a laminated, multi-layer filter element. Additional filters and methods relating to laminated, multi-layer filter elements are described in U.S. Patent Pub. Nos. 2011/0210059 and 2014/0275692, the entire disclosures of which are hereby incorporated by reference in its entirety.

However, when used in some applications, such as filtration at elevated temperatures or in chemically aggressive environments, a typical multi-layered filtration media is limited in chemical compatibility and temperature capability by the lowest melt temperature and chemical compatibilities of the different polymers in the bicomponent fiber. Thus, when the temperature or chemical capabilities of either polymer are exceeded, the filtration media can break down in use, resulting in decreased life span of the filter.

Filter media and filter constructions with improved resistance to challenging operating conditions is desired. These and other advantages of the invention, as well as additional inventive features, will be apparent from the description of the invention provided herein.

BRIEF SUMMARY OF THE INVENTION

It is the general object of the invention to provide an improved filter element made with improved methods for their manufacture. Surprisingly, has been realized that a laminated, multi-layered filter media does not require bicomponent fibers or other binders to achieve thermal bonding of adjacent layers. The invention provides such a laminated, multi-layer filter media and filter element.

In one aspect, the invention provides a multi-layer laminated filter media. The filter media includes a first layer of filter media with fibers that are non-bicomponent and free of binder material to comprise a first single melt component. The filter media also includes a second layer of filter media with fibers that are non-bicomponent and free of binder material to comprise a second single melt component. A thermally bonded interface joins the first layer and the second layer, using at least one of the first single melt component and the second single melt component.

In one aspect of the multi-layer laminated filter media, the first and second layers are formed from the same filter media sheet that is overlayed upon itself, so that the filter media of the first layer is the same as the filter media of the second layer.

In another aspect of the multi-layer laminated filter media, the first layer of filter media and the second layer of filter media are formed from different first and second filter media sheets, and the first filter media sheet has a different filtration efficiency and porosity as compared to the second filter media sheet.

In some aspects of the multi-layer laminated filter media, the first single melt component and second single melt component of the multi-layer laminated filter media may be the same polymer material.

The fibers of the first layer and the second layer of the multi-layer laminated filter media may individually include a single polymer selected from the group consisting of polyester, polypropylene, nylon, PCT (polycyclohexylenedimethylene terephthalate), and PPS (polyphenol sulfide).

In some aspects of the multi-layer laminated filter media, at least one of the first layer and the second layer of the multi-layer laminated filter media includes a heat treated felt material. The heat treated felt material may be a needle punched felt material comprising monofilament staple fiber consisting of a single polymer.

In another aspect of the multi-layer laminated filter media, different monofilament staple fibers are used in the first layer and the second layer to provide for different resistance and filtration efficiencies.

In various aspects of the multi-layer laminated filter media, the first and second layers of filter media each individually have an air permeability of between 10 cubic feet per minute and 2000 cubic feet per minute, measured by ASTM F778; a porosity of between 0.1 µm and 100 µm, measured by ASTM F316; and a filtration efficiency of greater than 50% for 100 µm sized solid particles, measured by ASTM F797; a Mullen burst strength of between 5 and 500 pounds per square inch, measured by ASTM D3786; a caliper thickness of between 0.1 and 5 millimeters; and a fiber diameter of between 5 µm and 200 µm.

In another aspect, the invention provides a tubular filter element with a multi-layer laminated filter media. The tubular filter includes a filter tube extending between opposite ends. The filter tube has an outer annular surface and an inner annular surface which define a hollow interior to afford passage of fluid along a central axis. The multi-layer laminated filter media is wrapped about the central axis into an annular shape, so that fluid passing from the outer annular surface and the inner annular surface must pass through the multi-layer laminated filter media.

In some aspects of the tubular filter element, the tubular filter element as a whole has an air permeability of between 1 cubic foot per minute and 1500 cubic feet per minute, measured by ASTM F778, and a filtration efficiency of greater than 50% for 100 µm sized solid particles, measured by ASTM F797.

In another aspect of the tubular filter element, the filter element has closed end caps bonded to or formed at opposite ends. The filter element also includes a seal ring on the outer annular surface in between opposite ends, and the filter element provides for two-stage filtration.

In another aspect of the tubular filter element, the filter element an open end cap bonded to or formed at one of the opposite ends, and a closed end cap bonded to or formed at a different one of the opposite ends, and the filter element provides a single filtration stage.

In another aspect, the present invention provides a method of forming the previously described multi-layer laminated filter media. The method includes the step of heating at least one surface of the first filter media layer to a glass transition point of first single melt component of the first filter media layer. The method also includes the step of thermally bonding the first filter media layer to the second filter media layer using the first single melt component.

In some aspects of the method of forming the a multi-layer laminated filter media, the first filter media includes a felt, also includes the step of, prior to heating, singeing a surface of at least one of the first layers to melt ends or portions of fibers into melt pools on the surface of the first layer, and allowing the melt pools to cool. The cooled ends or portions of fibers form bonding sites for adhesion between layers. After the melt pools are formed, the bonding sites are heated.

In some aspects of the method of forming the a multi-layer laminated filter media, the method also includes the step of conducting the same singeing and allowing operations to the second layer of filter media prior to the heating step.

In some aspects of the method of forming the a multi-layer laminated filter media, the method also includes the step of, immediately after the step of heating to facilitate thermal bonding, winding a sheet around a central axis in at least partial overlaying relationship upon itself. The sheet thereby provides for the first layer of filter media and the second layer of filter media, so that the first layer of filter media and the second layer of filter media are unitarily provided by the sheet.

In another aspect, the present invention provides a method of forming a laminated filter media. The method includes the steps of providing a first layer of filter media and heat treating a first side of the first layer of filter media to create melt pools. The first side of the first layer of filter media is cooled to create a plurality of bonding areas. A second layer of filter media is also provided. At least one of the first side of the first layer of filter media and a side of the second layer of filter media is heated, and the plurality of bonding areas are thermally bonded to the side of the second layer of filter media.

In some aspects of the method of forming a laminated filter media, the heat treating step is a singeing step.

In other aspects of the method of forming a laminated filter media, the first layer of filter media is provided as a first felted nonwoven polymer, and the second layer of filter media is provided as a second felted nonwoven polymer.

In another aspect of the method of forming a laminated filter media, the first layer of filter media and the second layer of filter media are provided from a single filter media sheet, and the single filter media sheet is overlayed upon itself such that the filter media of the first layer is the same as the filter media of the second layer.

In still other aspects of the method of forming a laminated filter media, the first layer of filter media and the second layer of filter media are provided from different first and second filter media sheets, respectively, and the first filter media sheet is provided with a different filtration efficiency and porosity as compared to the second filter media sheet.

In other aspects of the method of forming a laminated filter media, the first layer of filter media and the second layer of filter media are provided from first and second filter media sheets comprising a same polymer material.

In another aspect of the method of forming a laminated filter media, the first layer of filter media is provided without a bicomponent polymer or a binder material.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
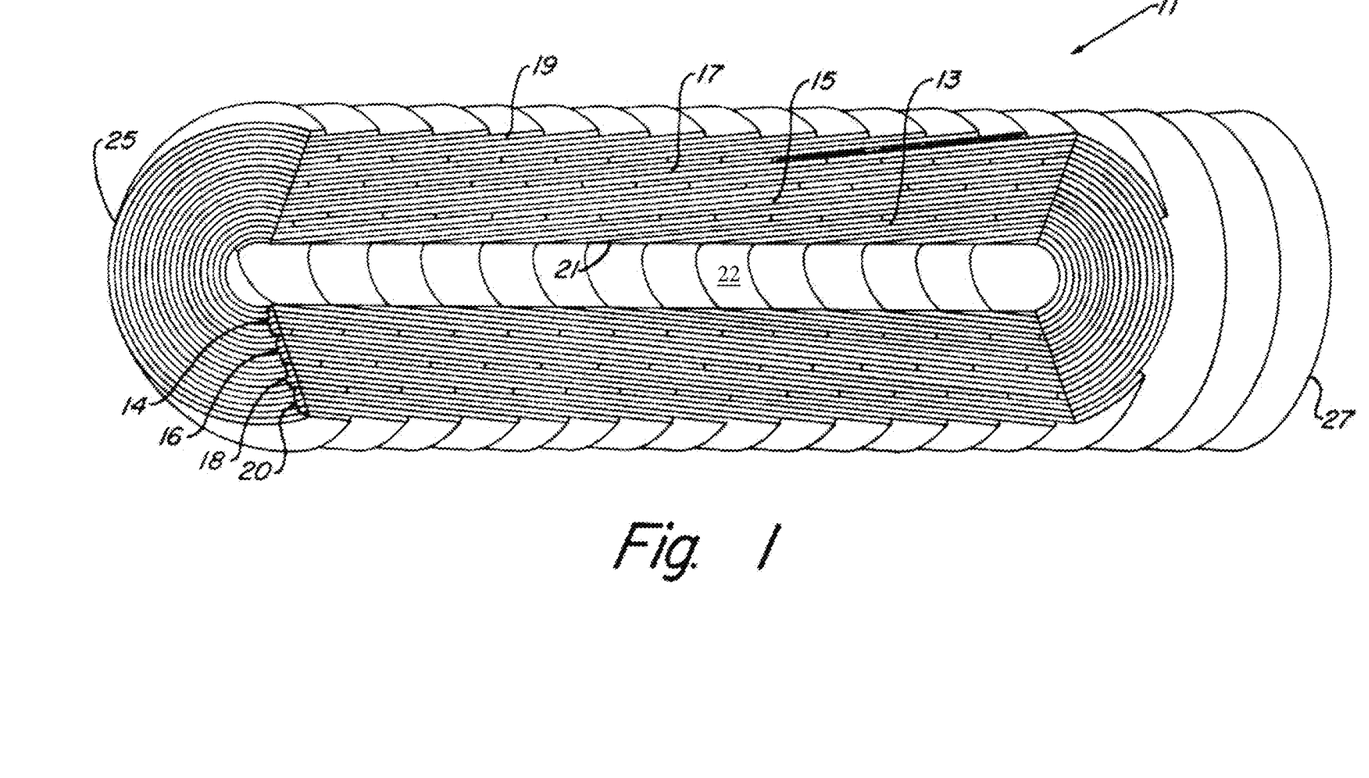
FIG. 1 is a perspective view in partial section of a preferred embodiment of the invention illustrating a multi-overlapped filter element.

Referring to FIG. 1 of the drawings, a multi-overlapped filter element 11 is shown constructed according to the present invention. In the embodiment shown, filter element 11 is a tubular filter element including a first multi-overlapped nonwoven fabric sheet or strip 13, a second multi-overlapped nonwoven fabric sheet in the form of a strip 15, a third multi-overlapped nonwoven fabric sheet or strip 17, and a fourth multi-overlapped nonwoven fabric sheet in the form of a strip 19. Each fabric sheet in the form of a strip 13, 15, 17, 19 is spirally or helically wound in overlapping layers to form overlapping bands 14, 16, 18, 20, respectively. The radially interior surface 21 of band 14 forms the periphery of an axially extending annular space 22 that extends from one end 25 of the filter element to the oppositely facing end 27 of the filter element 11. In other embodiments, filter element 11 may have two overlapped fabric strips, three overlapped fabric strips, or five or more overlapped fabric strips. Additional details on the structure and manufacture of filter element 11 may be found in U.S. Pat. No. 5,827,430, the entire disclosure of which is hereby incorporated by reference in its entirety. The singed felt multi-layer media filter element is particularly useful in an embodiment as shown in FIG. 1, for the reasons discussed below, but may also be useful in other wound constructions or even in pleated or other type of filter constructions.

According to an aspect of the present invention, the sheets or strips suitable for forming filter element 11 are formed from staple fibers, without the presence of bicomponent fibers or a binder. A staple fiber is a fiber constructed of one polymer and possessing substantially uniform thermal properties, such as melting point. Staple fibers have advantages over bicomponent fibers, such as uniform melting temperature and chemical resistance. Each sheet formed from a single type of staple fiber may be referred to as a single melt component. Staple fibers are also generally cheaper and easier to manufacture than bicomponent fibers. After the mat or sheet is formed, the sheet is preferably heat treated to alter the surface properties of the sheet while substantially retaining the selected porosity, as set forth in additional detail below.

Each strip of filter element 11 is wrapped under tension to thereby compress each layer to a selected degree. As successive sheets are wrapped and compressed, each layer is heated to thermally bond the layer to an underlying layer. Thermal bonding occurs when a sheet is warmed to the glass transition temperature ($T_g$) of a staple fiber or material component of the sheet, without substantially melting the material component of the sheet (that is, the surface of the sheet is heated to a temperature between $T_g$ and the melting temperature ($T_m$)). The sheet is then contacted with an adjacent sheet or strip, fusing individual fibers of adjacent sheets or strips together without completely melting the individual fibers. Because the staple fibers of the successive sheets may be thermally bonded directly to each other, an additional lower-melt point polymer (i.e., from a bicomponent fiber), or a separate binder, is not required. Adjacent sheets or strips may additionally be contacted under pressure to facilitate thermal bonding.

In some embodiments, the outermost surface of a sheet may be briefly raised above the $T_m$ of the staple fiber or material component of the sheet, provided substantial melting of the sheet does not occur. Some melting of polymer may occur, but is not preferred or is otherwise limited. Preferably, no melting of polymer fibers occurs during the thermal bonding process.

When forming a multi-layer laminated filter, a first layer of filter media (e.g., sheet 13) and a second layer of filter media (e.g., sheet 15) may be formed from the same filter media sheet overlayed upon itself. In other embodiments, the first layer of filter media and the second layer of filter media may be formed from different filter media sheets. Where different filter media sheets are present in filter element 11, the different filter media sheets may have the same physical properties (for example, filtration efficiency, porosity, fiber diameter, and polymer composition) or different physical properties.

In the embodiment shown in FIG. 1, filter element 11 is formed as a coreless filter element by wrapping on a mandrel. In an optional embodiment shown in FIG. 1A, filter element 11 may be wrapped onto a perforated core element 23. The core element 23 may be formed from any suitable material, such as a metal core element or a polymer core element. The polymer of a polymer core element may be the same polymer as one or more sheets of filter element 11, or may be a different polymer.

Figure 1A:
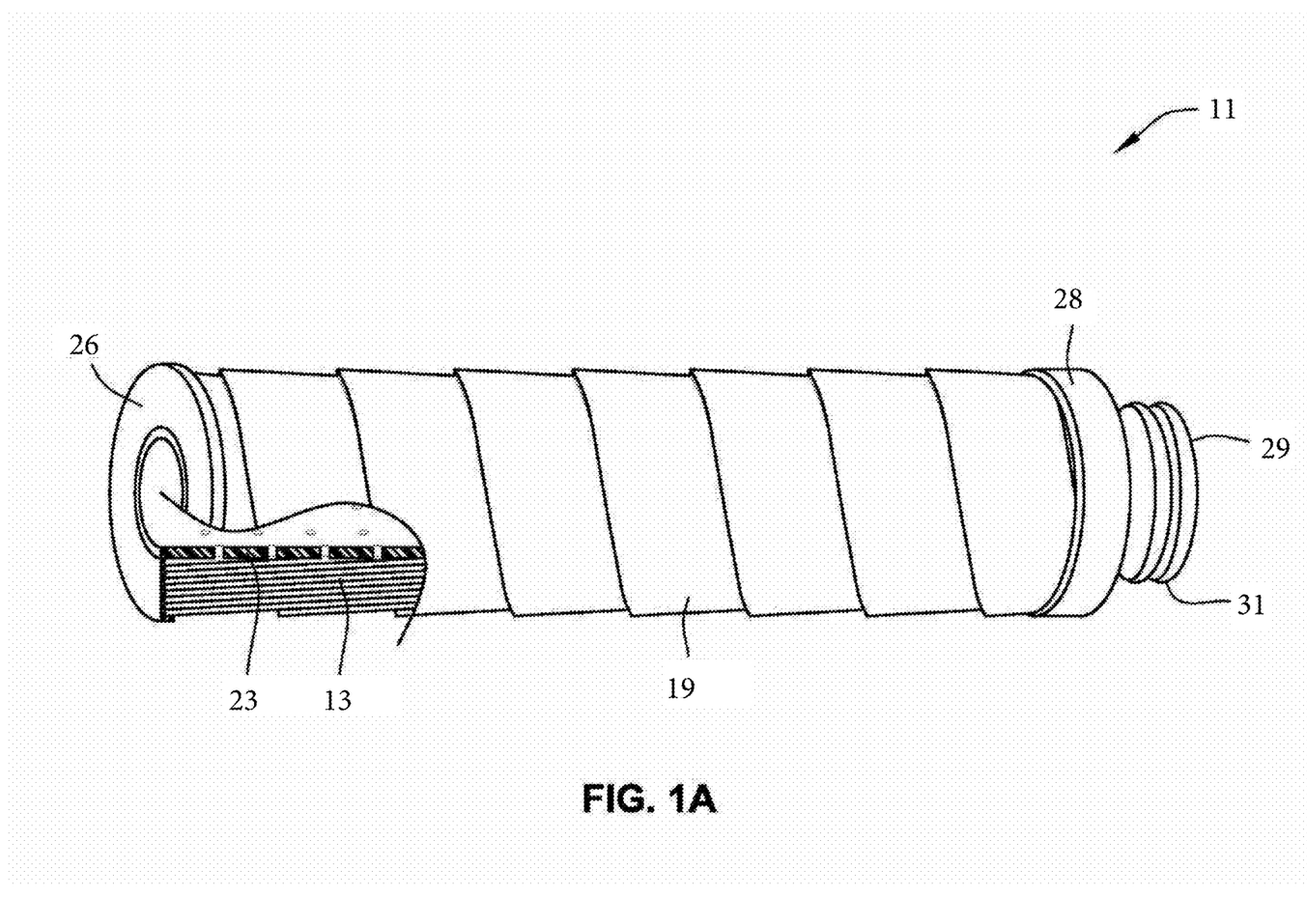
FIG. 1A is a perspective view of a filter element employing the filter media of FIG. 1 with an optional support core and end caps employed for a filtration application.

As also shown in FIG. 1A, filter element 11 is a tubular filter element including a laminated, multi-layer closed end cap 26. In the optional embodiment shown in FIG. 1A, filter element 11 may be configured with opposed closed and open end caps 26, 28 sealingly bonded to opposed ends of the tubular filter media. The open end cap 28 has an opening 29 to serve as an outlet port for a filtered fluid. One or more seals such as O-ring gaskets 31 may be disposed on the end cap 28 for sealing with a mounting head of a fluid system. Each end cap 26, 28 may be formed of any suitable material, such as a metal or polymer. The polymer of a polymer end cap may be the same polymer as one or more sheets of filter element 11, or may be a different polymer.

In alternate optional embodiment, the end caps 26, 28 may be two closed end caps for a two-stage filter to be used for the elements shown in U.S. Pat. No. 5,919,284, entitled "Gas filter separator coalescer and multi-stage vessel," the entire disclosure of which is hereby incorporated by reference in its entirety. In another embodiment, a multi-stage, laminate, multi-layer filter assembly may be configured as disclosed in U.S. Pat. No. 8,936,661 entitled "Multi-stage filter element," the entire disclosure of which is hereby incorporated by reference in its entirety. The multiple stage filter element assembly includes a first filter element which comprises a first tube of multi-layer filter media surrounding a longitudinal axis. The multiple stage filter element assembly also includes a second filter element which comprises a second tube of multi-layer filter media surrounding a longitudinal axis when assembled with the first filter element. The first filter element may be adapted to axially abut the second filter element with an internal flow passage therebetween. The multiple stage filter element assembly includes a first seal for the first filter element, and a second seal for the second filter element. The first and second seal elements may be adjacent to each other and proximate an interface between the first and second filter elements when in abutting relation.

In preferred embodiments of the present invention, the sheets or strips used to form filter element 11 are a felted nonwoven material. Felted nonwoven filter media may be manufactured from a wet or dry fibrous web followed by an entanglement process. Generally, a fibrous web may be produced by carding, air laying, or wet laying, as generally known in the art. The resulting fibrous web may then be entangled by one of several processes, as also known in the art. For example, the fibrous web may be needle punched, hydroentangled, or air entangled. In still other embodiments, other types of nonwoven filter media may employed, such as spunbonded fibrous webs or meltblown fibrous webs.

In a typical embodiment, a carded fibrous web is needle felted. Needle felting (also referred to as needle punching) bonds fibers of a fiber mat together by physically entangling individual fibers. The resulting needle felted web is suitable for laminated multi-layered filter elements. Fibers can be needle felted to form a mono-component fiber mat, eliminating the need for bicomponent fibers or another binder, and further eliminating the need for processing the fiber mat in an oven to thermally bond fibers together. The bonding between layers of felted material in a multi-layer laminated filter construction may be improved by heat treating the felted material after the needle punching process, as described in further detail below. Heat treatment may include calendering, singeing, infrared heating, or other forms of altering the surface properties of the felted material. The felted material may be heat treated on one or both sides of the sheet.

Generally, filter element 11 may be formed from any suitable polymer or natural fiber. Differing mono-filament staple fibers may be selected to achieve desired material properties including, but not limited to chemical resistance and filtration efficiencies. Suitable polymers include condensation polymers such as polyester, polyacetals, and polyamides, and addition polymers such as polyethylene, polytetrafluoroethylene (PTFE), and polypropylene. Polymers typically used in the construction of such laminated filters include polypropylene, polyester, and nylon. Additional polymers suitable for nonwoven filter media include higher melt-point staple fibers such as polycyclohexylenedimethylene terephthalate (PCT) and polyphenol sulfide (PPS). However, as will be recognized by one of ordinary skill in the art, the filter media is not limited to the foregoing materials and can readily be made of any material known in the art.

In a preferred embodiment of the present invention, felted materials suitable for forming filter element 11 are formed from a single type of staple fiber. In such monofilament fibrous webs, each sheet or strip of material of the multi-layer laminate has a single melt temperature. In other embodiments of the invention, felted materials suitable for forming filter element 11 may include fibrous webs having more than one type of staple fiber. In still other embodiments, felted materials suitable for forming filter element 11 may include both staple and bicomponent fibers. Where different felted materials are included in filter element 11, each different felted material may have the same physical properties (for example, filtration efficiency, porosity, resistance, fiber diameter, and polymer composition) or different physical properties.

In various embodiments, each layer of filter media in a multi-layer laminated filter media may individually have a permeability of between 10 and 2000 cubic feet per minute, as measured by ASTM F778. Additionally, each layer may individually have a porosity of between 0.1 µm and 100 µm, measured by ASTM F797. Each layer may individually have a filtration efficiency of greater than 50% for 100 µm sized particles (that is, particles having an effective diameter of 100 µm). Each layer may individually also have a Mullen burst strength of between 5 and 500 pounds per square inch, measured by ASTM D3786. Each layer may individually also have a caliper thickness of between 0.1 and 5 millimeters.

In various embodiments, staple fibers suitable for forming a felted filter media according to the present invention may have a diameter between 1 µm and 200 µm. In preferred embodiments, the staple fibers have diameters between about 1 µm to 5 µm, 5 µm to 30 µm, 30 µm to 50 µm, 50 µm to 200 µm, or greater than 200 µm. The size selected will impart different strength and filtration characteristics. In some embodiments, nanofibers (i.e., fibers having a diameter less than 1 µm) may be used, as disclosed in U.S. Pat. Pub. No. 2011/0210059, the entire disclosure of which is hereby incorporated by reference in its entirety.

Filter element 11 as a whole may have a permeability of between 1 and 1500 cubic feet per minute, as measured by ASTM F778. Additionally, filter element 11 may have a porosity of between 0.1 µm and 100 µm, as measured by ASTM F797. Filter element 11 may also have a filtration efficiency of greater than 50% for 100 µm sized particles.

Figure 2:
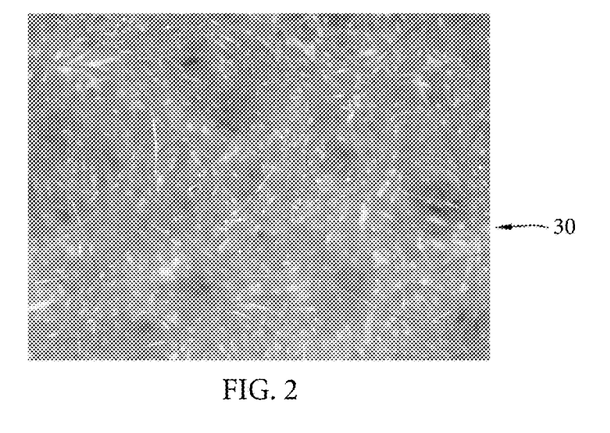
FIG. 2 is a magnified photograph of a needle-felted, single-component material.
Figure 2A:
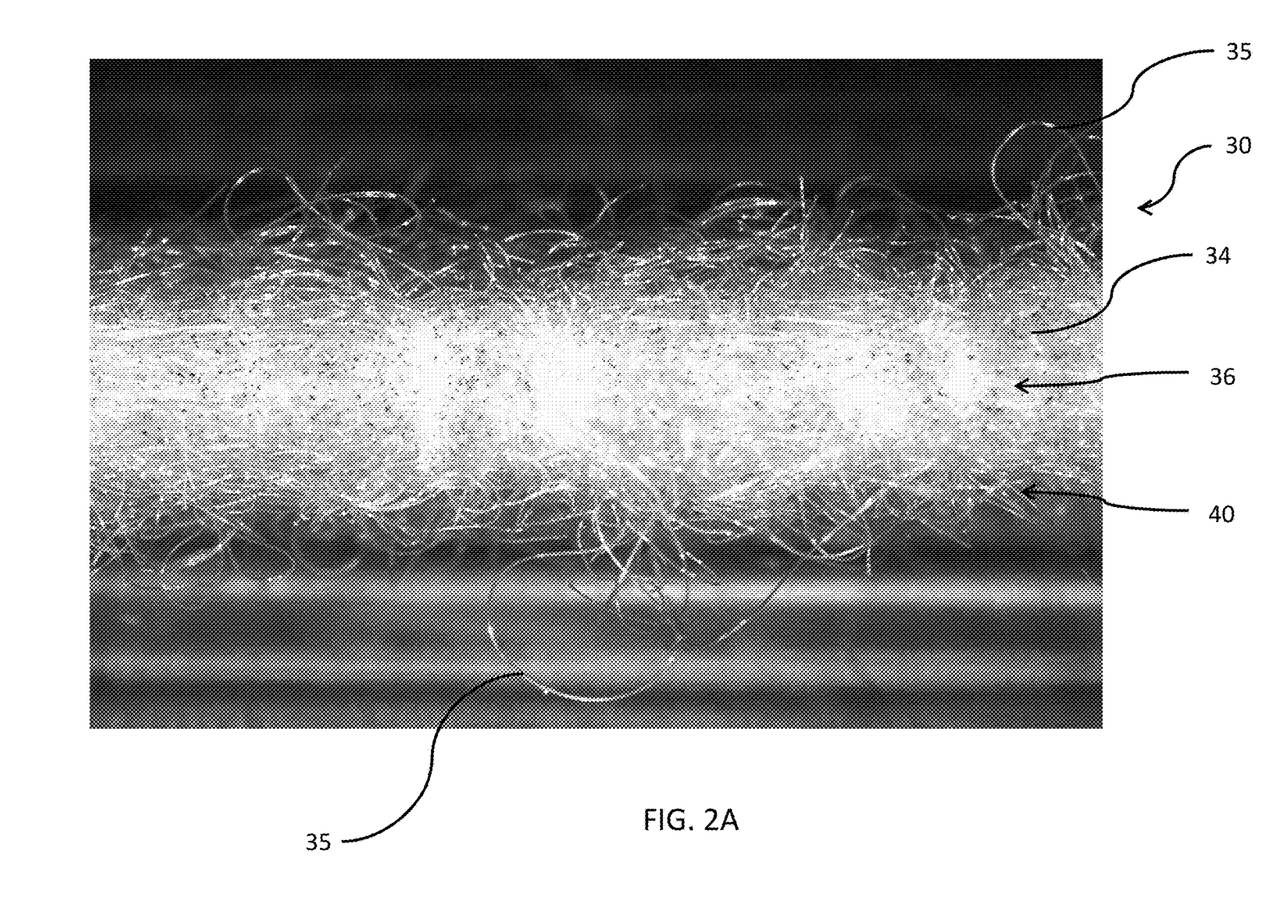
FIG. 2A is a magnified cross-sectional photograph of a needle-felted, single-component material.
Figure 3:
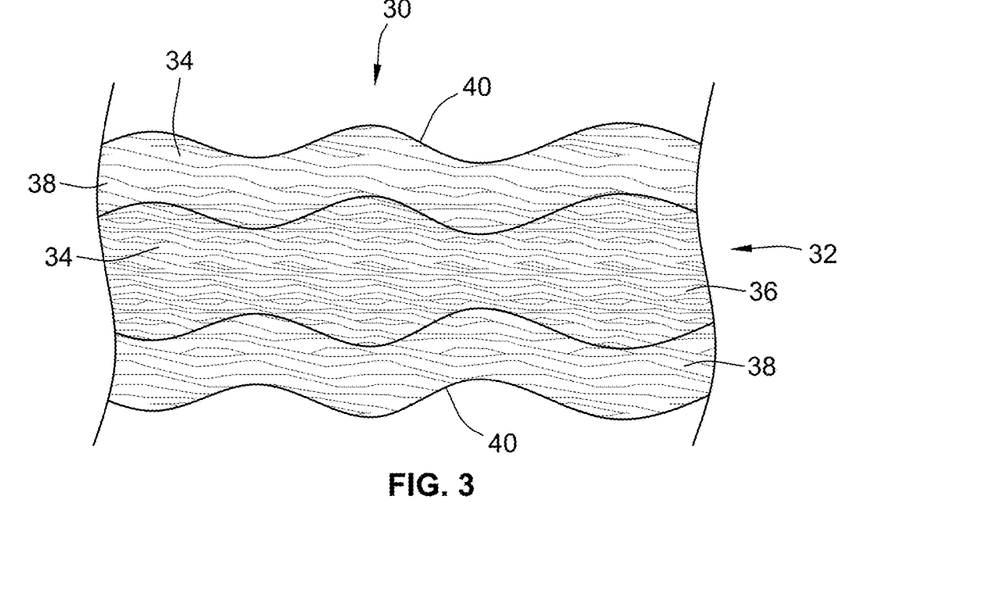
FIG. 3 is a schematic representational cross-section of the needle-felted, single-component material of FIGS. 2 and 2A.

Referring to FIG. 2, a magnified photo of a needle felted material 30 is shown. FIG. 2A is a magnified (50×) photograph of a cross-section of needle felted material 30. Additionally referring to FIG. 3, needle felted material 30 is a generally planar sheet 32 or fiber mat 32. The individual fibers 34 of the fiber mat 32 are physically entangled by a needle punching process. Individual fibers 34 are staple fibers or monocomponent fibers without a binder, resin, and do not need to be thermally bonded together. The needle felting process produces a fiber mat 32 having a denser entangled core 36 and an outer layer 38 that becomes progressively less dense from core 36 to outer surfaces 40. As best shown in FIG. 2A, approaching outer surfaces 40 from the direction of core 36, relatively few wisps 35 of individual fibers 34 are present. The essentially random entanglements of individual fibers 34 in the fiber mat 32 do not present large bonding sites proximate to outer surfaces 40 for adhering one layer of the material 40 to another material layer.

Figure 4:
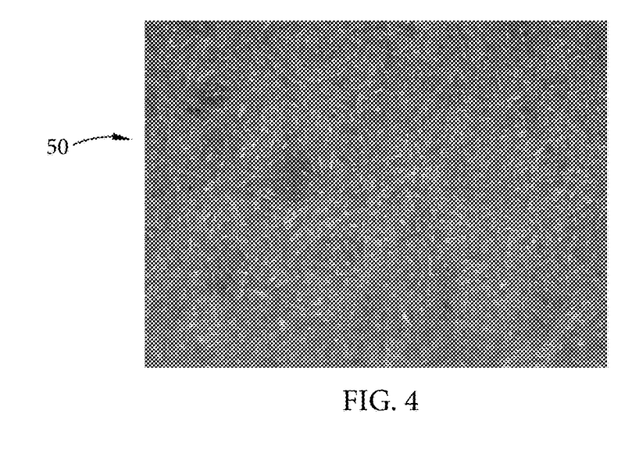
FIG. 4 is a magnified photograph of a needle-felted, single-component material after a calendaring operation, taken at the same magnification as FIG. 2.
Figure 4A:
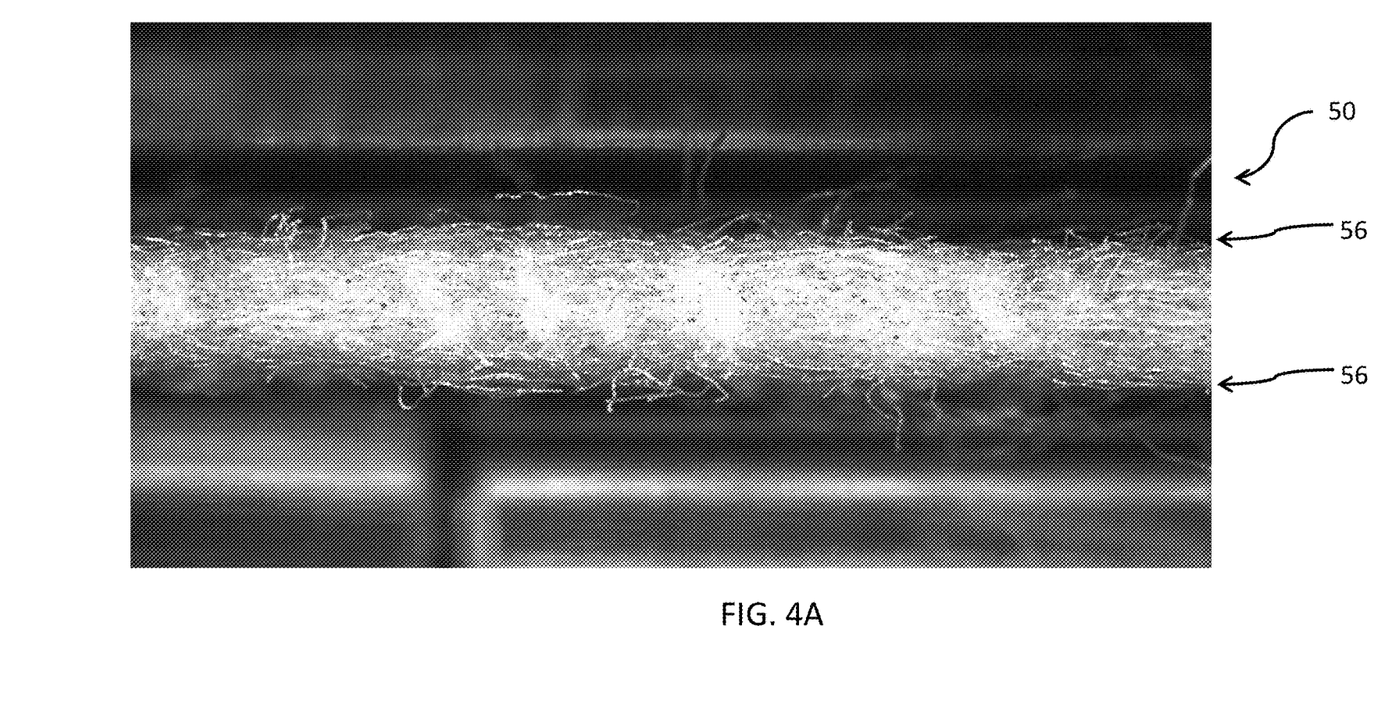
FIG. 4A is a magnified cross-sectional photograph of a needle-felted, single-component material after a calendaring operation, taken at the same magnification as FIG. 2A.
Figure 5:
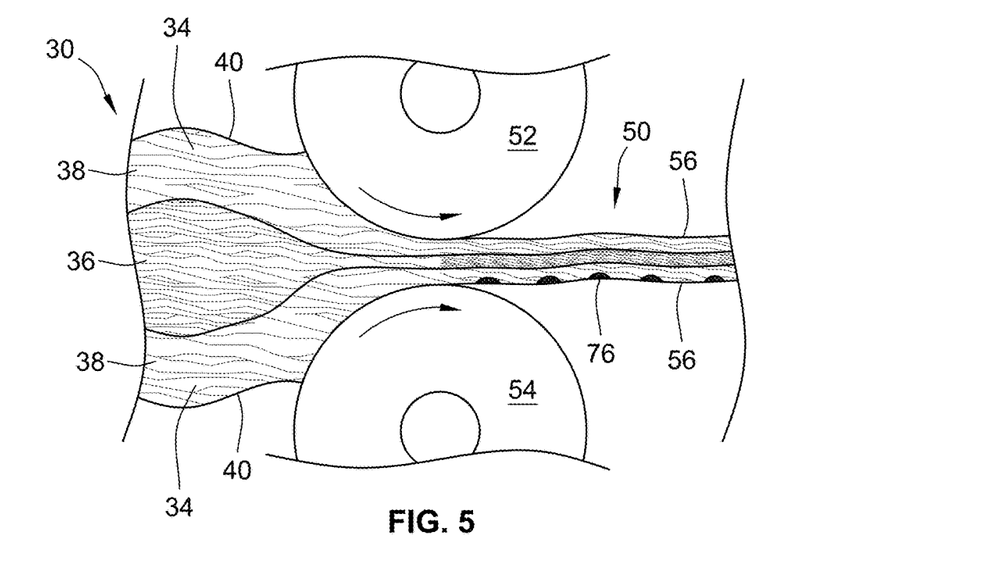
FIG. 5 is a schematic representational cross-section of calendering the needle-felted, single-component material of FIGS. 4 and 4A.

FIGS. 4-5 show a calendered felted material 50 after a calendering operation is applied to needle felted material 30. FIG. 4 is a magnified photo of the same type of needle felted material 30, taken at the same magnification and composed of the same type of fibers. FIG. 4A is a magnified (50×) photograph of a cross-section of needle felted material 50 after a calendering operation is applied to needle felted material 30. Further referring to FIG. 5, in a calendering operation, a needle felted material 30 is passed between two rollers 52, 54. As shown, the needle felted material 30 is passed between rollers 52, 54 to compress and smooth the surface of needle felted material 30, thereby producing a calendered felted material 50. As best shown in FIG. 4A, calender rollers 52, 54 compress the fiber mat 32 and smooth the calendered outer surfaces 56 of the calendered felted material 50, improving the availability of bonding sites proximate to calendered outer surfaces 56 relative to the limited bonding sites available on raw needle felted material 30. Calendered outer surface 56 is suitable for adhering one layer of the material to another material layer.

The calendering operation of FIG. 5 may be performed at elevated temperatures by heating one or both rollers 52, 54. Calendering at elevated temperatures may partially melt fibers on the outer surface of the fiber mat 32, creating pools of melted mono-filament material. Melt pools 78 on calendered outer surface 56 thereby improve the bonding strength between adjacent layers when formed into a multi-layer laminate, compared to thermal bonding of felted filter media without heat treatment. When calendering at elevated temperatures, the speed of the needle felted material 30 through rollers 52, 54 may be selected to raise the temperature of individual fibers 34 of outer layer 38 proximate to outer surfaces 40, without substantially softening or melting individual fibers 34 closer to core 36. The pressure applied to the fiber mat 32 may be selected by adjusting the minimum distance between calender rollers 52, 54.

Figure 6:
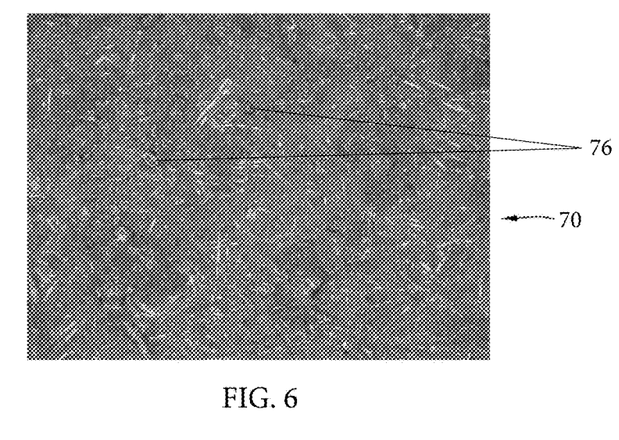
FIG. 6 is a magnified photograph of a needle-felted, single-component material after a singeing operation, taken at the same magnification as FIG. 2.
Figure 6A:
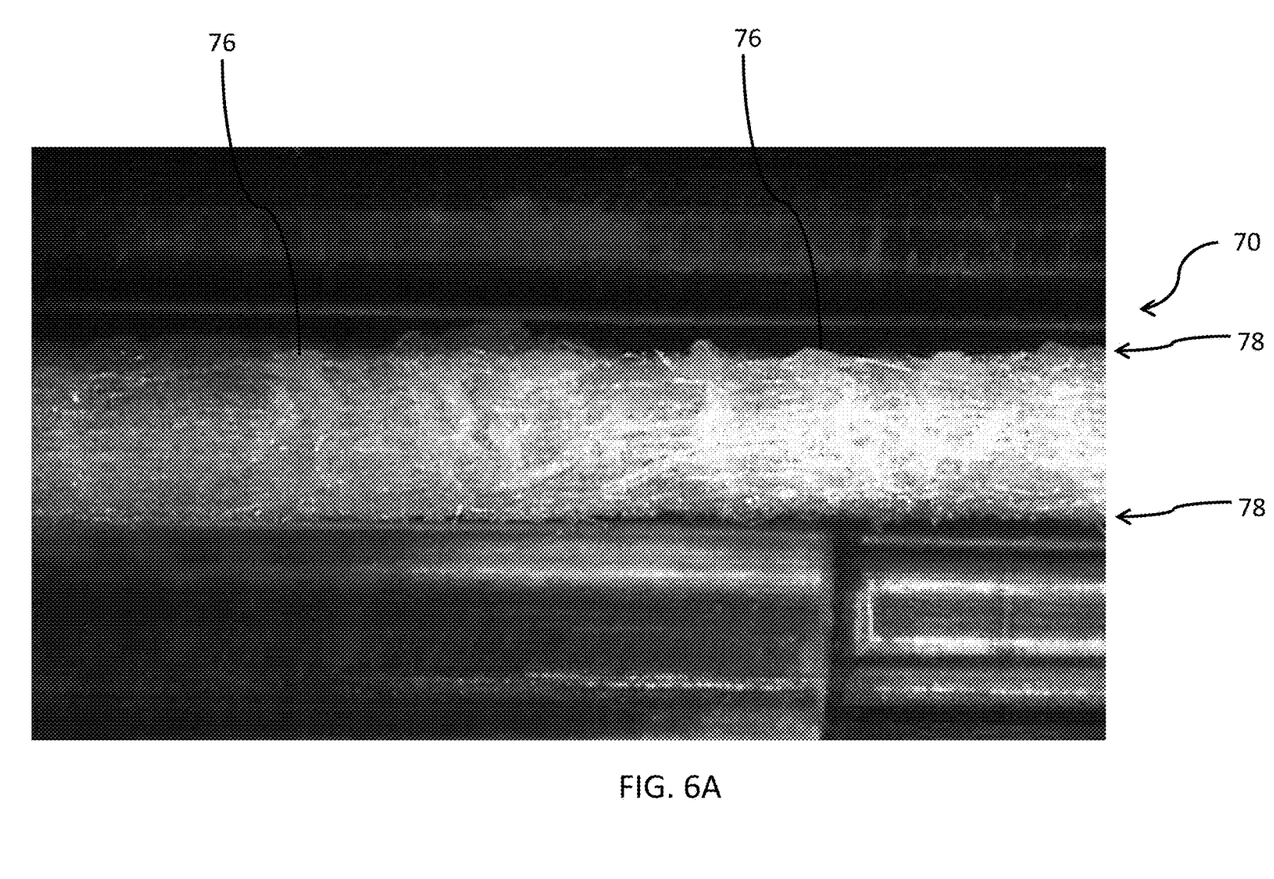
FIG. 6A is a magnified cross-sectional photograph of a needle-felted, single-component material after a singeing operation, taken at the same magnification as FIG. 2.
Figure 7:
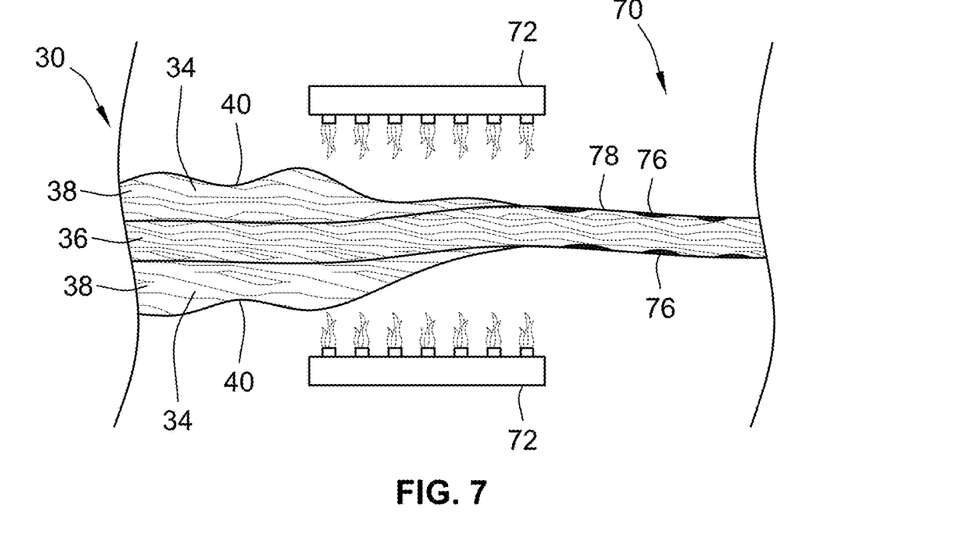
FIG. 7 is a schematic representational cross-section of singeing the needle-felted, single-component material of FIGS. 6 and 6A.

FIGS. 6-7 shows a singed needle felted material 70 after a singeing operation is applied to needle felted material 30. FIG. 6 is a magnified photo of the same type of needle felted material 30, taken at the same magnification and composed of the same type of fibers. FIG. 6A is a magnified (50×) photograph of a cross-section of needle felted material 70 after a singeing operation is applied to needle felted material 30. Further referring to FIG. 7, in a singeing operation, the needle felted material 30 is exposed to a heat source 72, for example a flame 74, for a brief period of time. That is, the surface of the sheet is exposed to elevated temperatures to quickly sear or melt fibers on the surface of the fiber mat 32, without substantially melting fibers throughout the core 36. The individual fibers 34 of the outer layer 38 of fiber mat 32 are thereby melted, forming melt pools 76 on the singed surfaces 78 of the fiber mat 32. As shown in FIGS. 6A and 7, singed needle felted material 70 is singed on both sides of fiber mat 32. Alternatively, a needle felted material 30 may be singed on one side of fiber mat 32. A needle felted material 30 may further be calendered to compress the core 36 of fiber mat 32, either before or after a singeing operation 72.

The presence of melt pools 76 on the singed outer surface 78 provides increased contact area for thermal bonding between adjacent layers on the singed outer surfaces 78 relative to the limited bonding contact area available for thermal bonding between adjacent layers on raw needle felted material 30. Singed outer surface 78 is suitable for adhering one layer of the material to another material layer. The melt pools 76 on the singed outer surface 78 thereby improve the bonding strength between adjacent layers when formed into a multi-layer laminate, compared to thermal bonding of felted filter media without heat treatment.

The melt pools 76 may be allowed to cool and solidify prior forming filter element 11. A first layer of filter media (e.g., sheet or strip 13) may be singed or otherwise heat treated prior to forming filter element 11. Additionally, second and successive layers of filter media (e.g. sheet or strip 15) may be singed or otherwise heat treated prior to forming filter element 11.

Preferably, the singed filter media and the melt pools 76 will be allowed to partially or more preferably fully cool and solidify. The singed filter media may then be stored (e.g., in a roll) until it is desired to make the filter element. Alternatively, a singeing operation may be performed immediately prior to manufacturing a filter element, such that partially melted melt pools are allowed to thermally bond to fibers of adjacent sheets during filter manufacturing.

Filter element 11 may be formed by heating a first layer (e.g., a singed strip 13 of a needle felted material) to a temperature just below the melting point of the single melt component to facilitate thermal bonding, and bonding the first layer to a second layer (e.g. strip 15) by thermal bonding of the first layer to the second layer. After heating the first layer to facilitate thermal bonding, the first layer may be wound around the central axis (e.g., axially extending annular space 22) to partially or completely overlap itself, thereby providing both the first layer and second layer from a single sheet of filter media.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-layer laminated filter media comprising:
   a first layer of filter media, the first layer of filter media comprising fibers that are non-bicomponent and free of binder material to comprise a first single melt component;
   a second layer of filter media, the second layer of filter media comprising fibers that are non-bicomponent and free of binder material to comprise a second single melt component;
   a thermally bonded interface between the first layer of filter media and the second layer of filter media utilizing at least one of the first single melt component and the second single melt component.

2. The multi-layer laminated filter media of claim 1, wherein the first layer of filter media and the second layer of filter media are formed from a single filter media sheet that is overlayed upon itself such that the filter media of the first layer is the same as the filter media of the second layer.

3. The multi-layer laminated filter media of claim 1, wherein the first layer of filter media and the second layer of filter media are formed from different first and second filter media sheets, respectively, and wherein first filter media sheet has a different filtration efficiency and porosity as compared to the second filter media sheet.

4. The multi-layer laminated filter media of claim 1, wherein the first single melt component and second single melt component are a same polymer material.

5. The multi-layer laminated filter media of claim 1, wherein the first single melt component and second single melt component are different polymer materials.

6. The multi-layer laminated filter media of claim 1, wherein fibers of the first layer of filter media and the second layer of filter media each individually comprise a single polymer selected from the group consisting of polyester, polypropylene, nylon, PCT (polycyclohexylenedimethylene terephthalate), and PPS (polyphenol sulfide).

7. The multi-layer laminated filter media of claim 1, wherein at least one of the first layer of filter media and the second layer of filter media comprises a heat treated felt material.

8. The multi-layer laminated filter media of claim 7, wherein the heat treated felt material comprises a needle punched felt material, the needle punched felt material comprising monofilament staple fiber consisting of a single polymer.

9. The multi-layer laminated filter media of claim 8, wherein different monofilament staple fibers are used in the first layer and the second layer to provide for different resistance and filtration efficiencies.

10. The multi-layer laminated filter media of claim 1, wherein the first layer of filter media and the second layer of filter media each individually have:
   an air permeability of between 10 cubic feet per minute and 2000 cubic feet per minute, measured by ASTM F778;
   a porosity of between 0.1 μm and 100 μm, measured by ASTM F316; and
   a filtration efficiency of greater than 50% for 100 μm sized solid particles, measured by ASTM F797;
   a Mullen burst strength of between 5 pounds per square inch and 500 pounds per square inch, measured by ASTM D3786;
   a caliper thickness of between 0.1 and 5 millimeters; and
   a fiber size of between 1 μm and 200 μm.

11. A tubular filter element comprising the multi-layer laminated filter media of claim 1, comprising:
   a filter tube extending between opposite ends and comprising an outer annular surface and an inner annular surface, the inner annular surface defining a hollow interior to afford passage of fluid along a central axis, the multi-layer laminated filter media being wrapped about the central axis into an annular shape such that fluid passing from the outer annular surface and the inner annular surface must pass through the multi-layer laminated filter media.

12. The tubular filter element of claim 11, wherein the tubular filter element as a whole comprises:
   an air permeability of between 1 cubic foot per minute and 1500 cubic feet per minute, measured by ASTM F778; and
   a filtration efficiency of greater than 50% for 100 μm sized solid particles, measured by ASTM F797.

13. The tubular filter element of claim 11, further comprising closed end caps bonded to or formed at the opposite ends, and a seal ring on the outer annular surface intermediate opposite ends, wherein the filter element provides for two-stage filtration.

14. The tubular filter element of claim 11, further comprising an open end cap bonded to or formed at one of the opposite ends, and a closed end cap bonded to or formed at a different one of the opposite ends, wherein the filter element provides a single filtration stage.

15. A method of forming the multi-layer laminated filter media of claim 1, comprising:
   heating at least one surface of the first filter media layer to a glass transition point of first single melt component of the first filter media layer;
   thermally bonding the first filter media layer to the second filter media layer using the first single melt component.

16. The method of claim 15, wherein the first filter media comprises a felt, and comprising:
   prior to heating, singeing at least one surface of the first layer to melt ends or portions of fibers into melt pools on the surface of the first layer, and
   allowing the melt pools to cool to form bonding sites for adhesion between layers, and thereafter performing said heating.

17. The method of claim 16, further comprising conducting the same singeing and allowing operations to the second layer of filter media prior to said heating.

18. The method of claim 16, comprising immediately after said heating to facilitate thermal bonding winding a sheet around a central axis in at least partial overlaying relationship upon itself to thereby provide for the first layer of filter media and the second layer of filter media, wherein the first layer of filter media and the second layer of filter media are unitarily provided by the sheet.

19. A method of forming the multi-layer laminated filter media of claim 1 comprising the step of:
   providing the first layer of filter media;
   heat treating a first side of the first layer of filter media to create melt pools on the first side of the first layer of filter media;
   cooling the first side of the first layer of filter media to create a plurality of bonding areas;
   providing the second layer of filter media;
   heating at least one of the first side of the first layer of filter media and a side of the second layer of filter media; and
   thermally bonding the plurality of bonding areas to the side of the second layer of filter media.

20. The method of claim 19, wherein the heat treating step is a singeing step.

21. The method of claim 19, wherein the first layer of filter media is provided as a first felted nonwoven polymer, and wherein the second layer of filter media is provided as a second felted nonwoven polymer.

22. The method of claim 19, wherein the first layer of filter media and the second layer of filter media are provided from a single filter media sheet, and further comprising the step of overlaying the single filter media sheet upon itself such that the filter media of the first layer is the same as the filter media of the second layer.

23. The method of claim 19, wherein the first layer of filter media and the second layer of filter media are provided from different first and second filter media sheets, respectively, and wherein first filter media sheet is provided with a different filtration efficiency and porosity as compared to the second filter media sheet.

24. The method of claim 19, wherein the first layer of filter media and the second layer of filter media are provided from first and second filter media sheets comprising a same polymer material.

25. The method of claim 19, wherein the first layer of filter media is provided without a bicomponent polymer or a binder material.

* * * * *